Dec. 24, 1963 T. F. HUETER 3,115,588
ELECTROACOUSTICAL APPARATUS
Filed Feb. 5, 1958 3 Sheets-Sheet 1
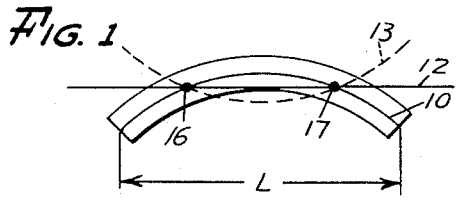
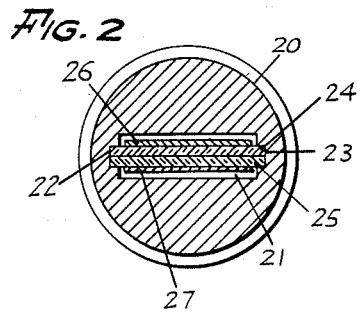
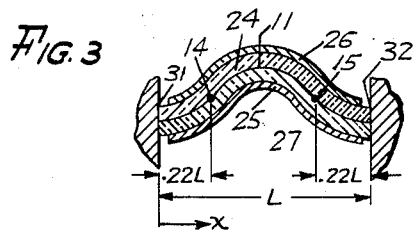
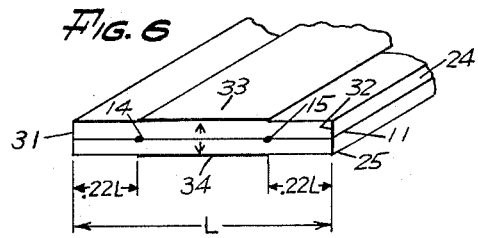
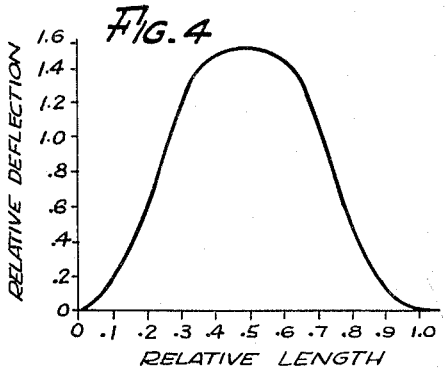
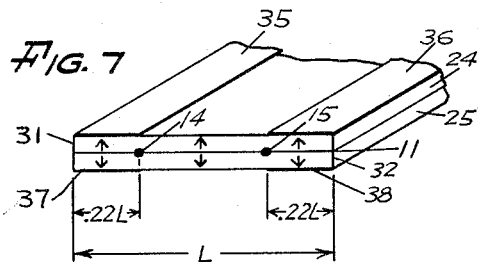
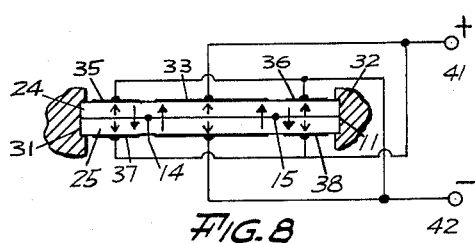
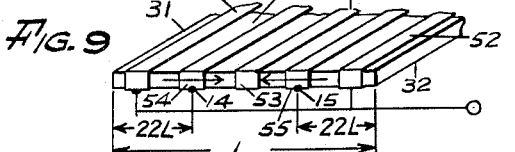
INVENTOR
THEODOR F. HUETER
BY Elmer J. Gorn
ATTORNEY Dec. 24, 1963    T. F. HUETER    3,115,588
ELECTROACOUSTICAL APPARATUS
Filed Feb. 5, 1958    3 Sheets-Sheet 2
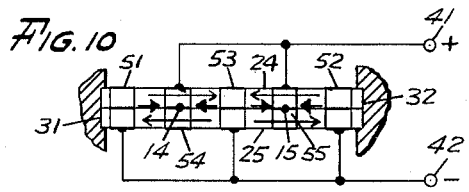
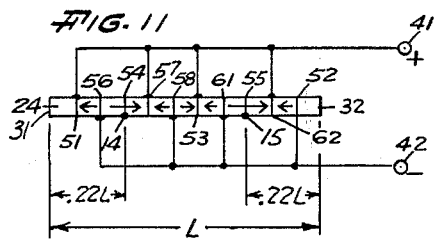
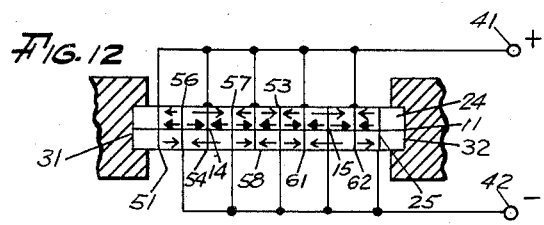
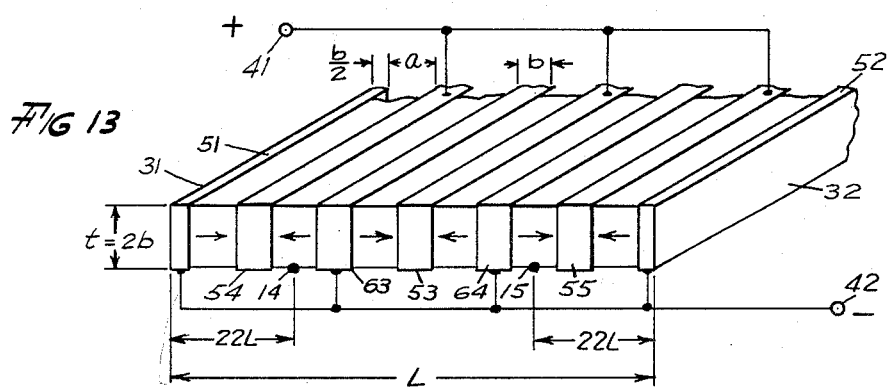
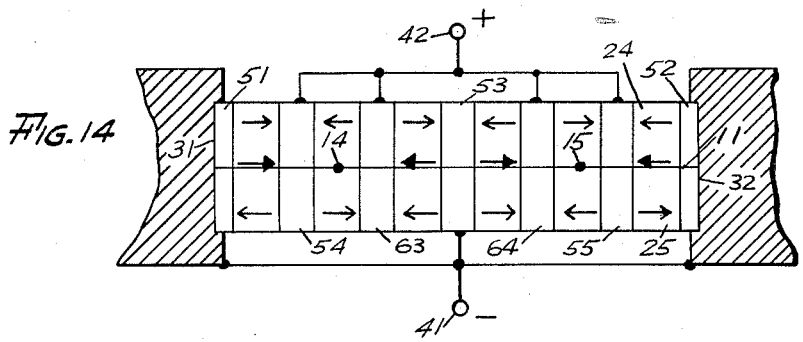
LEGEND
→ P
➤ E
INVENTOR
THEODOR F. HUETER
BY Elmer J. Gorn
ATTORNEY

LEGEND
→ P
➤ E

INVENTOR
THEODOR F. HUETER
BY Elmer J. Gorn
ATTORNEY

3,115,588
ELECTROACOUSTICAL APPARATUS
Theodor F. Hueter, Waban, Mass., assignor to Raytheon Company, Lexington, Mass., a corporation of Delaware
Filed Feb. 5, 1958, Ser. No. 713,466
17 Claims. (Cl. 310—8.6)

The present invention relates in general to electroacoustical systems and more particularly concerns a novel piezoelectric bender transducer wherein the electrode structure and prepolarization techniques effectively combine to enhance the degree of energy transformation through the achievement of a substantially higher coupling coefficient.

Generally speaking, a bender is a flexing transducer formed of laminae of piezoelectric material, bonded together and arranged to deform in opposite directions when appropriately activated. For example, a bender may consist of two barium titanate transverse expander plates, cemented face to face in such a manner that a voltage applied to the electrodes causes one plate to expand and the other to contract. The resultant deformation is analogous to the bending of a bimetallic thermostatic element as temperature variations causes different incremental length changes of the two metals forming the element.

Conversely, mechanical bending of the transducer will result in the generation of a corresponding electrical signal between the electrode terminals. By suitable bender design, it is possible to achieve displacements in response to applied signals which are considerably in excess of the actual transverse expansion or contraction of either constituent plate. This capacity for relatively large motions is one of the most advantageous characteristics of the bender transducer.

The performance characteristic of a transducer is best expressed by its "effective coupling coefficient," designated as $k$, which is a measure of the fractional amount of electrical energy converted into mechanical energy; thus, $k$ is defined as the ratio of the energy stored mechanically to the energy stored electrically in response to a driving electrical signal. Apart from the nature of the material itself, the effective coupling coefficient for a bender is to a considerable extent dependent upon the electrode design, the relationship between the direction of excitation and that of the prepolarization, and the specific techniques for supporting the piezoelectric elements within the transducer housing.

Conventional bilaminar bender elements, such as used in phonograph pickups, consists of two oppositely polarized laminae, commonly referred to as expander plates, cemented tightly together at a common interface and uniformly electroded on the sides opposite the common interface. The direction of polarization is generally parallel to the thickness dimension of the binder plates. A driving potential applied across the electrodes establishes an electric field parallel to the thickness dimension which opposes the polarization in one plate, causing thickness contraction, and aids the polarization in the other, effecting thickness expansion. In accordance with the Poisson constant of the piezoelectric material, the plates expand and contract lengthwise, respectively, to cause the bender assembly to deform along its length.

Uniform electroding over the whole length of the bender elements has been used with free-free, clamped-free and clamped-clamped benders. The terms "clamped" and "free" refer to the condition of the respective ends of the bender element separated by its length. Thus, if both ends are free to move without restriction in response to an input signal, the bender is termed a free-free bender. It follows, therefore, that a clamped-free bender has one end clamped and the other free, while both ends of a clamped-clamped bender are restrained from moving.

An example of a transducer utilizing a clamped-clamped bender is disclosed in the copending application of E. E. Turner, entitled Electroacoustical Apparatus, Serial No. 701,552, filed December 9, 1957, now abandoned, and assigned to the assignee of this application. In one embodiment of the invention disclosed by Turner, a bender is shown supported in a diametrical plane of a hollow cylindrical housing, the edges of the bender at opposite ends of the length dimension being rigidly secured within grooves in the cylinder wall. In this manner, vibratory motion of the bender is transmitted to the housing and vice versa.

When customary uniform electroding techniques are applied to this type of clamped-clamped bender, some cancellation of the piezoelectrically induced bending forces must result, since contraction and expansion near the center of the respective plates is, by necessity, accompanied by expansion and contraction, respectively, near both the clamped ends. Comparisons between free-free and clamped-clamped operation of the same bender element have shown that the effective coupling coefficient for the conventional uniformly electroded element is reduced considerably upon clamping; e.g., from $k=0.12$ when free-free to $k=0.06$ when clamped-clamped. The reduced coupling is especially disadvantageous for applications in which large bandwidth and high efficiency are desired.

The present invention has as a primary object the attainment of appreciably higher efficiencies with clamped-clamped bender transducers. Basically, this is achieved by a novel electrode arrangement which imposes the external excitation in predetermined relationship with a sectionalized pattern of polarization whereby the reaction in each section aids the bender in assuming the deformed shape naturally resulting from the clamping technique. Thus, substantially all the piezoelectric force generated within the bender is directed toward causing deflection in the appropriate direction at each point along the length dimension of the bender, while substantially no action is lost in opposing the establishment of the particular configuration associated with the selected vibrational mode.

More specifically, the plates of a clamped-clamped bender in one of its vibrational modes are characterized by inflection points separating regions having curvatures of opposite sense. Thus, a clamped-clamped bender of length L vibrating in the fundamental mode has two inflection points along its length at approximately 0.22L and 0.78L, measured from one edge thereof, to define left, central and right end sections. By localizing the bender electrodes in accordance with this invention, and prepolarizing each plate to establish polarized regions of prescribed sense in the portions between electrodes, proper electrode interconnection results in piezoelectric stressing in each section to aid the natural deformation of the bender. In operation, the sense of the driving electric field established between adjacent electrodes relative to polarization therebetween is the same in the end sections of each one of the bender plates as in the central section of the other.

It is, therefore, an object of the invention to arrange electrodes in surface contact with the piezoelectric plates, or laminae, of a bender transducer for establishing fields therein properly oriented relative to both the polarization of the respective sections and the dynamic stress distribution of the bender for exchanging electrical and mechanical energy with a high degree of coupling.

Still another object of the invention is to achieve a high degree of conversion from electrical to mechanical energy by establishing electric fields of desired intensity with relatively low input potentials. This is accomplished by employing electrodes in the form of conducting strips of optimum width and spacing for the bender length and thickness. In this manner substantial components of the polarization and the applied electric fields are oriented parallel to the common interface between plates.

Still another object of the invention is to increase the coupling coefficient by imposing maximum driving electric fields where the curvature of the plates is the greatest. For this purpose, the clamped edges of a bender transducer may be electroded and used in establishing part of the field pattern.

It is an object of the invention to facilitate the fabrication of efficient bender transducers. This is accomplished by forming each plate of separate rectangular blocks of piezoelectric material having electroded opposite edges, and securing the blocks to each other with the electroded edges of adjacent blocks in surface contact. An additional feature of this arrangement is that the electric field established when a potential is applied between the electroded edges is parallel to the common interface between the bender plates.

Other features, objects and advantages will become apparent from the following specification when read in connection with the accompanying drawing in which:

FIG. 1 illustrates the deformed cross-sectional shape of a free-free bender;

FIG. 2 is a cross-sectional view of a transducer utilizing a clamped-clamped bender supported in a diametrical plane of a hollow cylindrical structure;

FIG. 3 shows the deformed cross-sectional shape assumed by a clamped-clamped bender when vibrating in the fundamental mode;

FIG. 4 is a normalized plot of the relative deflection of the deformed clamped-clamped bender as a function of its length;

FIG. 5 is a normalized plot of the curvature of a clamped-clamped bender as a function of its length;

FIG. 6 is a fragmentary view of a clamped-clamped bender transducer uniformly electroded in the region between inflection points;

FIG. 7 is a fragmentary view of a clamped-clamped bender uniformly electroded in the regions between each clamped edge and the nearest inflection point;

FIG. 8 is an end view of a clamped-clamped bender uniformly electroded in the region between inflection points and also in the regions between each clamped edge and the nearest inflection point to form three distinct pairs of electrodes;

FIG. 9 shows a piezoelectric plate having strip electrodes connected for prepolarization;

FIG. 10 illustrates the plate of FIG. 9 bonded to a like plate whose corresponding sections are oppositely polarized, the electrodes being connected according to the invention;

FIG. 11 illustrates a plate of segmented construction rranged for prepolarization and formed of blocks of piezoelectric material, each block having opposite edges conductively coated to form electrodes, the conductively coated edges of adjacent blocks being in contact;

FIG. 12 shows the segmented plate of FIG. 11 bonded to a like plate oppositely polarized to form a bender transducer with electrodes joined according to the invention;

FIG. 13 illustrates a piezoelectric plate with an alternative electrode arrangement, the electrodes being connected for prepolarization;

FIG. 14 shows a piezoelectric plate electroded as in FIG. 14 bonded to a similarly electroded plate to form a bender transducer;

Throughout the drawings, like elements are identified by the same reference symbol. Polarization vectors are designated by open arrow heads, while electric field vectors are shown by filled arrow heads.

Figure 15:
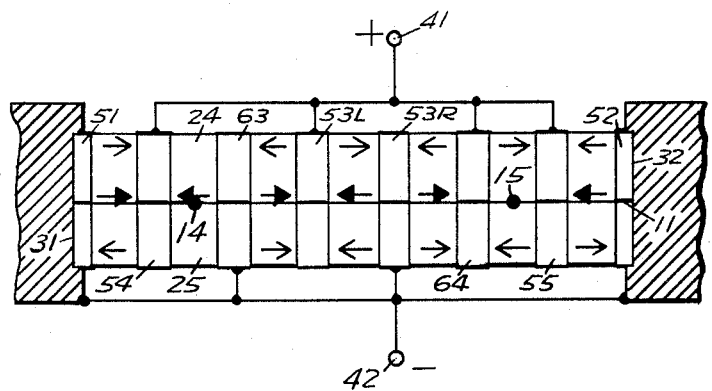
FIG. 15 illustrates a bender transducer which is a variant of that shown in FIG. 14.

With reference now to the drawing, FIG. 1 thereof illustrates the deflection of the interface 10 of a free-free bender from its quiescent, normally horizontal plane 12, in response to an input signal. When a signal of opposite sense and equal amplitude is applied, the interface 10 is deflected to a position indicated by the broken line 13. Observe that the nodal points 16 and 17 remain undeflected.

Referring to FIG. 2, there is shown a cross-sectional view of a transducer utilizing a clamped-clamped bender supported within a hollow cylindrical housing 20. This transducer has been described in detail in the above-cited Turner application. Generally, however, a rectangular hollow region 21 extends axially through the body of cylinder 20, the side walls thereof being formed with diametrically opposed parallel clamping slots 22 and 23. Two rectangular piezoelectric expander plates 24 and 25 are rigidly bonded to each other, as with cement, over the common rectangular interface 11. A pair of uniform, conductive rectangular electrodes 26 and 27 are attached to the opposed external surfaces of expander plates 24 and 25, respectively, to provide means for electrically energizing the bender or conversely deriving an electrical signal therefrom in response to applied pressure variations.

Referring to FIG. 3, the deflection of the clamped-clamped bender of the type disclosed in FIG. 2 in response to an input signal is illustrated on an exaggerated scale. By virtue of the restriction imposed at the clamped edges, the configuration of the bender is such that regions on opposite sides of two inflection points, 14 and 15, have curvatures of opposite sense to that of the central section. Curvature is the second derivative of the deflection, and since the stresses within an internally stressed member are also proportional to the second derivative of the deflection curve, it follows that there is also a reversal in the sense of stress in the respective expander plates on opposite sides of each inflection point. Hence, in upper plate 24 the section from left edge 31 to inflection point 14 is compressively stressed, the central section between inflection points 14 and 15 is in tensile stress, and the section from inflection point 15 to the right end 32 is in compression. Corresponding sections in lower expander plate 25 are stressed oppositely. Thus, the end sections from left end 31 to inflection point 14 and from inflection point 15 to right end 32 are in tension while the central section between inflection points 14 and 15 is in compression.

Analytically, the deflection of the bender as a function of the coordinate $x$ extending from the left end 31 along the length dimension L is given by:

$$y = A(\cosh kx - \cos kx) + B(\sinh kx - \sin kx)$$

where A and B are constants; $k = \omega/c$; $\omega$ is the frequency of vibration in radians/second; and $c$ is the sound velocity of flexural waves for a plate of the thickness and material used in the expander plates. By differentiation, it can be shown that the points of inflection of the bender are approximately half way between the clamping points and the center, namely at 0.22L and 0.78L measured from the left end, FIG. 3. In view of the relation between stress and curvature, both the curvature and stress are zero at each inflection point and of opposite sense on opposite sides thereof.

Referring to FIG. 4, the analytical expression for the deflection of interface 11 of the clamped-clamped bender when deformed as shown in FIG. 3 is graphically represented in normalized form. It is to be understood that when the input signal causing the deflection represented in FIG. 4 is of the same amplitude, but of opposite sense, the curve of FIG. 4 is inverted. In FIG. 5, there is shown a normalized plot of curvature corresponding to the second derivative of the normalized deflection curve shown in FIG. 4. The plot of curvature is also a normalized representation of the internal stresses developed along the length of the bender transducer; however, it will be recalled from the discussion above that the stresses developed at a given point along the length in upper and lower expander plates 24 and 25, respectively, though equal in magnitude, are of opposite sense.

Examination of FIGS. 3, 4 and 5 will reveal the inherent disadvantage of the uniform surface electroding technique illustrated in FIGS. 2 and 3 as applied to the clamped-clamped bender. Evidently, the central section of the bender shown in FIG. 3 is deformed with a curvature corresponding to that imposed by the applied signal. To the left and right of inflection points 14 and 15 respectively, however, the curvature is of opposite sense and effectively the material in each of these end regions is stressed in opposition to the piezoelectrically induced forces. Stated otherwise, the reverse curvature of the end regions represents a loss in terms of the effective coupling coefficient. For the clamped-clamped bender with uniform surface electrodes as shown in FIG. 3, $k$ was found to be as low as 0.06.

With reference to FIG. 6, there is shown a fragmentary perspective view of a bender transducer electroded for avoiding the development of piezoelectric stresses opposing deformation of the bender plates. This is accomplished by uniformly and conductively coating the outer surfaces of upper and lower expander plates 24 and 25, respectively, in the central section only between inflection points 14 and 15 to provide upper and lower central electrodes 33 and 34, respectively. In the conventional manner, before being cemented together, upper expander plate 24 and lower expander plate 25 are oppositely polarized perpendicularly of the common interface therebetween, as indicated by the polarization vectors, designated P. When signals are applied to electrodes 33 and 34, piezoelectric forces are developed only in the central region of the bender, there being no force cancellation in the non-electroded end regions. Under these conditions, a marked improvement in the coefficient of coupling over that available from the structure shown in FIG. 3 is obtained.

Referring to FIG. 7, a fragmentary perspective view of a bender transducer is illustrated showing another uniform electroding technique for avoiding cancellation of the piezoelectrically induced forces. The structure is the same as in FIG. 6 except upper and lower electrodes 33 and 34, respectively, have been replaced by upper end electrodes 35 and 36 and lower end electrodes 37 and 38, formed by uniformly coating the outer surfaces of the end sections between each edge of the bender plates and respective inflection points. With this type of electroding, even higher coupling coefficients are obtainable.

Referring to FIG. 8, there is shown an end view of a bender formed of upper and lower expander plates 24 and 25 with the left and right edges clamped and utilizing electrodes 33–38 inclusive, which are interconnected, thus combining the features of FIGS. 6 and 7. Observe the insulating gaps between central and end electrodes. Lower central electrode 34 and upper end electrodes 35 and 36 are connected to terminal 42, while upper central electrode 33 and lower end electrodes 37 and 38 are all connected to terminal 41. With upper and lower expander plates 24 and 25 polarized normal to the interface 11 as indicated, and terminal 41 positive relative to terminal 42, the instantaneous electric fields established in the end and central sections are as indicated by the electric vectors having the filled arrowheads, designated E.

Notice that in the end sections, the driving electric fields oppose the polarization in upper plate 24 while aiding the polarization in lower plate 25. The reverse is true in the central section; that is, the established electric field respectively aids and opposes the polarization in upper and lower plates 24 and 25. Thus, in the central region and in both end regions, the driving signal tends to cause the bender to assume the shape shown in FIG. 3. Rather than effect a cancellation, the forces in the end regions aid the bender deformation, thereby materially improving efficiency. This type of electrode arrangement and driving circuit optimizes the coupling coefficients obtainable with the simple transverse polarization technique.

In the embodiments disclosed in FIGS. 2, 3, 6, 7 and 8, polarization and drive were both normal to the bender interface. Considerable advantages are available by initially polarizing the piezoelectric plates or laminae so that a substantial component of polarization is along the length dimension between the clamped edges. Electric fields for reacting with the polarization in response to an input signal are also established along the length direction. As a result, the reaction between the polarization and the electric fields established in the respective sections produces expansions and contractions parallel to the length of the bender by operating on the longitudinal piezoelectric coefficient, rather than on the transverse coefficient where the driving field is across the thickness dimension. Moreover, high coupling may be obtained with electrodes at different potentials spaced further and further apart. Therefore, increased potentials may be applied between adjacent electrodes without danger of electrical field breakdown across the insulating gap therebetween. These advantages are achieved by utilizing strip electroding techniques instead of the earlier described uniform electroding.

Referring to FIG. 9, a fragmentary perspective view of the upper piezoelectric plate 24 of a bender transducer is shown with five conductive strip electrodes 51–55, which extend continuously and completely around the plate, appropriately connected for pre-polarization. In this manner polarization substantially along the length direction is obtained in a desired sense in each region between the strip electrodes. End electrodes 51 and 52 enclose upper plate 24 near left and right edges 31 and 32, respectively, and are connected to terminal 41. Center strip 52 is connected to terminal 42. During polarization, inflection point strips 54 and 55, located at inflection points 14 and 15, respectively, remain disconnected. With terminal 42 positive relative to terminal 41 as indicated, localized polarization as indicated by the P vectors is established.

Referring to FIG. 10, an end view of a strip-electroded bender is shown with upper plate 24, as shown in FIG. 9, bonded to a complementary, oppositely polarized lower plate 25 to form a bender clamp at left and right edges 31 and 32. The strip electrodes are appropriately connected so that the desirable results of the invention are achieved, and it will be observed that complementary electrodes on the upper and lower plates are in contact at the interface. Inflection point electrodes 54 and 55 are connected to input terminal 41 while the end electrodes 51 and 52 and central electrodes 53 are connected to terminal 42. With terminal 41 positive relative to terminal 42, respective electric fields, designated by the vectors E are established in the regions between the electrodes. Note that in the end sections of upper plate 24 and in the central section of lower plate 25, the electric field aids the polarization, while in the end sections of lower plate 25 and the central section of upper plate 24, the established electric fields and the polarization are opposed. Hence, throughout the bender, the forces are such as to aid the plates in assuming the shape shown in FIG. 3, that is, substantially all of the driving power is effective in achieving the deformation naturally arising from this vibrational mode.

Referring to FIG. 11, an end view of the upper plate 24 of a bender is shown, segmented construction being used to enhance the field pattern in the piezoelectric material. Plate 24 is shown connected for prepolarization in accordance with the principles of the invention, and is formed of eleven distinct rectangular blocks of piezoelectric material, each block of material electroded on a pair of opposite faces, the electroded, conductively coated faces of adjacent blocks being cemented or otherwise rigidly secured in surface contact. Electrodes 51 and 56, and 52 and 62 lie in the end regions between inflection point electrodes 54 and 55 and the respective edges. The central region includes electrodes 57, 58, 53 and 61. For prepolarization, electrodes 51, 57, 53 and 62 are connected to terminal 41. Electrodes 56, 58, 61 and 52 are connected to terminal 42. The inflection point electrodes 54 and 55 remain disconnected. With terminal 41 positive relative to terminal 42, the regions between electrodes are polarized in the direction indicated by the P vectors. A lower complementary plate for the bender is formed in the same manner, but polarized oppositely with terminal 41 negative relative to terminal 42.

Referring to FIG. 12, there is shown an end view of a clamped-clamped bender formed of segmented expander plates electroded and polarized in the manner described above in connection with FIG. 11. Three rows of vectors respectively designate the localized polarization pattern in the regions between electrodes in upper plate 24, the driving electric field established with terminal 41 positive relative to terminal 42, and the localized polarization pattern in the regions in lower plate 25. In operation, alternate electrodes 51, 54, 58, 61 and 62 are connected to terminal 41, while the remaining electrodes 56, 57, 53, 55 and 52 are connected to terminal 42. Observe that in the end sections of upper plate 24 and the central sections of lower plate 25 the driving electric field is in the same sense as the polarization, while in the end sections of lower plate 25 and the central section of upper plate 24, the electric field opposes the polarization. Consequently, the reaction in each segment of the bender is such as to cause the structure to assume the deformation shown in FIG. 3. Reversing the polarity of terminal 41 relative to terminal 42 simply reverses the sense of the curvature in each segment of the device.

The segmented construction of FIG. 12 has certain advantageous features which are to be noted. First, since the electrodes are disposed normal to the cross-section of the laminae, the polarization and the driving electric fields are directed entirely along the length dimension, there being virtually no components orthogonal to this direction, such as may exist with the surface strip electrodes shown in FIGS. 9 and 10. Secondly, the relatively close spacing between electrodes enables a desired field strength to be established in the piezoelectric material with a relatively small exciting potential applied between terminals 41 and 42. Third, the intensity of the piezoelectric stressing field along the length dimension is substantially uniform throughout the entire segment of piezoelectric material between field establishing electrodes, thereby enhancing the degree of electro-mechanical coupling of the transducer.

FIG. 13 is a perspective view of one rectangular expander plate for a bender, strip electroded for optimum performance, the various electrodes being shown connected for prepolarization. Several departures from the previously described embodiments are to be noted. Electrodes 51 and 52 are applied to the ends of the plate by conductively coating left and right edges 31 and 32, respectively. The electrodes 54 and 55, instead of being located precisely at the inflection points 14 and 15, are respectively to the left and right thereof. Left and right central electrodes 63 and 64, respectively, are symmetrically arranged about center electrode 53.

The width of all but the end electrodes is designated at $b$, the width of each end electrode is $b/2$, the spacing between strips is $a$, and the thickness of piezoelectric plate 24 is $t$. For desired operation, the number $N$ of strips between electrodes 51 and 52, the width $b$ of each of these strips, the spacing $a$ between strips, the length $L$, and the thickness $t$ are related as follows, provided that the spacing between strips is constant throughout the bender:

$$N(a+b)=L$$

Furthermore, the amount of polarization that is longitudinally ineffective, namely in the fringe field directly adjacent to the strips, is minimized if the following two approximate relations are observed:

$$a \approx 3b$$
$$t \approx 2b$$

Combining the relations we then obtain for the optimum number of strips:

$$N \approx L/2t$$

In prepolarizing upper plate 24, alternate electrodes 54, 53 and 55 are connected to terminal 41, while the remaining electrodes 51, 63, 64 and 52 are connected to terminal 42. When terminal 41 is positive relative to terminal 42, the regions between electrodes are polarized in the sense indicated by the respective P vectors. The lower plate of the bender is polarized in the same manner but with the relative polarity between potentials on terminals 41 and 42 reversed.

Referring to FIG. 14, an end view of a bender formed of complementary upper and lower piezoelectric plates 24 and 25, respectively, bonded together and electroded as in FIG. 13, is shown with electrodes appropriately interconnected for the application of driving fields in accordance with the principles of the invention. Note that electrodes 51 and 52 are electrically connected to the conductive structure in which they are clamped and this structure, along with center electrode 53, is connected to terminal 41. Adjacent electrodes 54 and 63 and adjacent electrodes 55 and 64 are connected to terminal 42. Thus, between these adjacent electrodes, no driving electric field is established. It will be observed that, as in the other embodiments, the electric fields established with terminal 42 positive relative to terminal 41 aid the polarization in the end sections of upper plate 24 and the central section of lower plate 25 while opposing the polarization in the end sections of lower plate 25 and the central section of upper plate 24. The resultant deformation again is as in FIG. 3, with the drive in each section contributing a force which aids the assumption of this shape.

The electrode pattern shown in FIG. 14 is especially advantageous. In the regions around the inflection points (14 and 15) where curvature is slight and little driving field is required, there is no electric field. However, in the regions of high curvature in the center and at the extreme ends of the bender, electric fields are established in the proper sense relative to the polarization in the respective sections to develop relatively high piezoelectric stresses therein, thereby further enhancing conversion efficiency. Furthermore, both end electrodes are at the same potential, which is convenient since the structure in which they are clamped may then be electrically grounded. Moreover, the symmetrical disposition of electrodes facilitates polarization and fabrication on a production basis.

In FIG. 15, there is illustrated an end view of a bender having a modified electrode strip pattern. Here two strip electrodes 53L and 53R in the central region on opposite sides of the mid-point replace center electrode 53 of FIG. 14. End electrodes 51 and 52 are again maintained at the same potential, thereby permitting the structure in which they are clamped to be grounded. The more closely spaced electrodes permit a desired field intensity within the plates to be obtained with a lesser applied potential.

To obtain the localized indicated polarization vectors P in the regions between electrodes, the plates must be separately polarized. In each case electrodes 54, 63, 53R and 55 are connected to terminal 41 while electrodes 51, 52, 53L and 64 are connected to terminal 42. With terminal 41 positive relative to terminal 42, the polarization indicated in upper plate 24 is obtained. When the relative polarity between terminals 41 and 42 is reversed, the polarization pattern indicated in lower plate 25 is obtained. After polarization, the two plates are bonded together and connected, as shown in FIG. 15, with electrodes 54, 53L, 64 and 55 connected to terminal 41 and electrodes 51, 52, 63 and 53R, to terminal 42.

Again, maximum piezoelectric stresses are induced in the regions of greatest curvature. Although an electric driving field is established in the region of small curvature around inflection point 14, the absence of polarization for reaction with the electric driving field results in no piezoelectric stresses being developed. In the region of small curvature around inflection point 15, no electric field is established to react with the polarization therein, since electrodes 64 and 55 are maintained at the same potential. Hence, no piezoelectric stresses are developed in this region.

With terminal 41 positive relative to terminal 42, respective electric fields are established which aid the polarization in the end sections of upper plate 24 and the central section of lower plate 25. In the end sections of lower plate 25 and the central section of upper plate 24, the established electric field opposes the polarization. As a result, the bender is deformed as described above.

Figure 16:
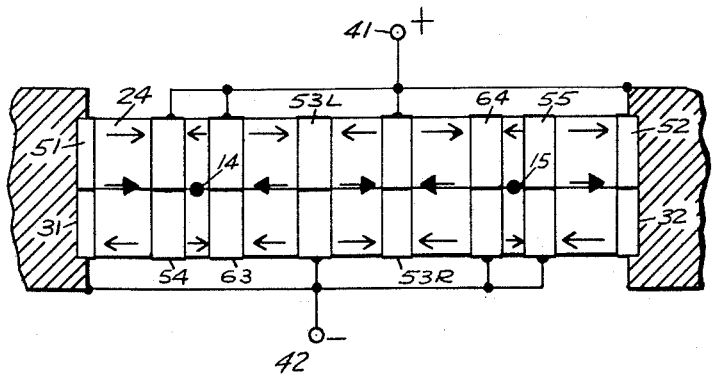
FIG. 16 illustrates a bender transducer which is a further variant of that shown in FIG. 14.

FIG. 16 illustrates an end view of a bender having the electrode arrangement of FIG. 15; however, the establishment of a somewhat different polarization pattern coupled with different electrode interconnections results in end electrodes 51 and 52 being at different potentials. This may be advantageous in certain applications where the means clamping the ends of the bender are electrically insulated.

In prepolarizing the respective plates, electrodes 54, 53L, 64 and 52 are connected to terminal 41 and electrodes 51, 63, 53R and 55, to terminal 42. When terminal 41 is positive relative to terminal 42, the polarization pattern indicated in upper plate 24 is obtained; when the relative polarity is reversed, the polarization pattern of lower plate 25 is obtained.

Once polarized in the indicated manner, the plates are bonded together and electrodes 54, 63, 53R and 52 are connected to terminal 41, while electrodes 53L, 55, 64 and 51 are connected to terminal 42. Since the electrodes on either side of the inflection points 14 and 15 are at the same potential, no field is established in the vicinity of the inflection points where there is little curvature. However, in the end and central regions where curvature is more significant, relatively large piezoelectric stressing fields are established. With terminal 41 positive relative to terminal 42, the respective established fields aid the polarization in the end sections of upper plate 24 and the central section of lower plate 25. The polarization is opposed in the end sections of lower plate 25 and the central section of upper plate 24. Again, the drive and polarization combine so that the bender is desirably deformed in the manner described above.

In the foregoing, bender transducers have been described which exchange electrical and mechanical energy with an opitmal coefficient of coupling. By utilizing the electroding and polarization techniques described, large bandwidth and high conversion efficiency may be obtained with relatively low input impedance.

Although the detailed description above refers to a bender vibrating in the fundamental mode, the principles disclosed are obviously applicable to benders vibrating in higher order modes. Further, since each of these bender transducers is a bilateral device, the enumerated advantages are realized equally in use as a signal transmitter or a signal receiver.

The various specific embodiments are by way of example only. It is apparent that those skilled in the art may make numerous modifications of and departures from these specific embodiments without departing from the inventive concepts. Consequently, the invention is to be construed as limited only by the spirit and scope of the appended claims.

What is claimed is:

1. Electroacoustical apparatus including a bender transducer restrained at both ends thereof comprised of a pair of polarized piezoelectric bender plates secured along a common interface and adapted for vibration in a mode characterized by regions of opposite curvature spaced along the length dimension thereof, said bender plates being formed with electrodes on the respective surfaces opposite said interface arranged to enable the exchange of electrical energy with each of said regions independently of the other in a manner tending to maximize the mechanical coupling coefficient of said transducer.

2. Electroacoustical apparatus including a bender transducer restrained at both ends thereof comprised of a pair of polarized piezoelectric bender plates secured along a common interface, and supported for vibration in a mode characterized by adjoining regions of opposite curvature, said bender plates being formed with complementary electrodes on the respective surfaces opposite said interface in each of said regions, and means for applying electrical signals to said electrodes for imparting forces to said piezoelectric plates to establish opposite bending stresses in adjacent regions of said bender transducer spaced along the length dimension thereof.

3. Electroacoustical apparatus including a bender transducer restrained at both ends thereof comprised of a pair of piezoelectric plates bonded along a common interface and having a pair of clamped opposed edges separated by the bender length dimension, said bender being thereby supported for vibration in a mode characterized by adjoining regions of opposite curvature separated by inflection points, and a plurality of mutually spaced strip electrodes associated with at least one of said regions affixed to the surfaces of said bender and extending transversely of said length dimension.

4. Electroacoustical apparatus including a bender transducer comprised of a pair of piezoelectric plates bonded along a common interface and having a pair of clamped opposed edges separated by the bender length dimension, said bender being thereby adapted for vibration relative to the inflection point of said plates in a mode characterized by adjoining regions of opposite curvature separated by said inflection points, and a plurality of mutually spaced strip electrodes associated with each of said regions affixed to the surfaces of said bender and extending transversely of said length dimension.

5. Electroacoustical apparatus as in claim 4 and including strip electrodes in the region of said points of inflection.

6. Electroacoustical apparatus as in claim 4 and including electrodes for applying electrical signals to and receiving electrical signals from said clamped edges of said bender transducer.

7. Electroacoustical apparatus including a bender transducer comprised of a pair of piezoelectric plates bonded along a common interface and having a pair of clamped opposed edges separated by the bender length dimension, said bender being thereby supported for vibration in a mode characterized by adjoining regions of opposite curvature separated by inflection points, a plurality of mutually spaced strip electrodes associated with each of said regions affixed to the surfaces of said bender and extending transversely of said length dimension, said piezoelectric plates being polarized in a direction substantially parallel to both said common interface and length dimension.

8. Electroacoustical apparatus including a bender transducer comprised of a pair of piezoelectric plates bonded along a common interface and having a pair of clamped opposed edges separated by the bender length dimension, said bender being thereby supported for vibration in a mode characterized by adjoining regions of opposite curvature separated by inflection points, a plurality of mutually spaced strip electrodes associated with each of said regions affixed to the surfaces of said bender and extending transversely of said length dimension, said piezoelectric plates being polarized in a direction substantially parallel to both said common interface and said length dimension, the direction of polarization in one of said plates in the region between any two adjacent strip electrodes being opposite to the direction of polarization in the other of said plates in the region between the same two electrodes.

9. Electroacoustical apparatus including a bender transducer comprised of a pair of piezoelectric plates bonded along a common interface and having a pair of clamped opposed edges separated by the bender length dimension, said bender being thereby supported for vibration in a mode characterized by adjoining regions of opposite curvature separated by inflection points, a plurality of mutually spaced strip electrodes associated with each of said regions affixed to the surfaces of said bender and extending transversely of said length dimension, said piezoelectric plates being polarized in a direction substantially parallel to both said common interface and said length dimension, the direction of polarization in one of said plates in the region between any two adjacent strip electrodes being opposite to the direction of polarization in the other of said plates in the region between the same two electrodes, and means interconnecting said strip electrodes enabling the application of driving fields to said piezoelectric plates substantially parallel to the polarization therein and oriented relative thereto to impart opposite bending stresses to regions oppositely adjacent said inflection points.

10. Electroacoustical apparatus as in claim 9 wherein in each of said plates the direction of polarization is the same in the regions opposite each of said inflection points.

11. Electroacoustical apparatus as in claim 9 wherein the interconnection of said strip electrodes substantially precludes the establishment of said driving fields in the region of each of said inflection points.

12. Electroacoustical apparatus in accordance with claim 9 wherein the width of said strip electrodes measured along said bender length dimension is substantially one-half the thickness of each of said piezoelectric plates and the spacing between said strip electrodes is substantially three times said width.

13. Electroacoustical apparatus in accordance with claim 12 and including electrodes at the clamped edges of said bender transducer, the width of each of said last mentioned electrodes measured along said bender length dimension being substantially one-fourth the thickness of each of said piezoelectric plates.

14. Electroacoustical apparatus including a piezoelectric bender transducer, means for clamping said bender transducer at the ends thereof for vibration in a mode characterized by adjacent regions of opposite curvature separated by inflection points, electrode means coacting with said bender transducer being supported in a manner adapted to transmit mechanical energy and being formed with electrodes spaced along the length dimenson thereof enabling the exchange of electrical energy with at least one of said regions independently of the others in a manner tending to maximize the mechanical coupling coefficient of said transducer.

15. Electroacoustical apparatus including a piezoelectric bender transducer clamped for vibration in an end-supported mode characterized by adjacent regions of opposite curvatures separated by inflection points, said bender transducer being formed with electrodes enabling the application thereto of driving fields effective to impart opposite bending stresses to regions adjacently opposite each of said inflection points.

16. A piezoelectric bender transducer restrained at both ends thereof, a plurality of electrode means spaced along the length dimension thereof to enable the simultaneous application of independent driving fields selectively oriented to impart opposite bending stresses to adjacent regions of opposite curvature separated by inflection points.

17. Electroacoustical apparatus including a piezoelectric bender transducer restrained at both ends thereof having predetermined polarization, said bender transducer being formed with a plurality of electrodes spaced along the length dimension thereof enabling the simultaneous application of independent driving fields selectively oriented relative to said polarization to impart in the region of the inflection points opposite bending stresses to adjacent regions thereof in a manner tending to maximize the mechanical coupling coefficient of said transducer.

References Cited in the file of this patent

UNITED STATES PATENTS

| 1,693,806 | Cady | Dec. 4, 1928 |
| 1,781,680 | Cady | Nov. 18, 1930 |
| 1,866,267 | Nicolson | July 5, 1932 |
| 2,515,446 | Gravley | July 18, 1950 |
| 2,540,187 | Cherry | Feb. 6, 1951 |
| 2,640,889 | Cherry | June 2, 1953 |
| 2,791,403 | Hall | May 7, 1957 |
| 2,867,701 | Thurston | Jan. 6, 1959 |
| 2,875,355 | Petermann | Feb. 24, 1959 |